Patented Mar. 14, 1950

2,500,600

UNITED STATES PATENT OFFICE 2,500,600

COMPOSITIONS OF MATTER CONTAINING EPOXY ETHERS AND DIAMINES

Theodore F. Bradley, Oakland, Calif., assignor to Shell Development Company, San Francisco, Calif., a corporation of Delaware No Drawing. Application February 28, 1948, Serial No. 12,152

15 Claims. (Cl. 260—47)

1

This invention relates to compositions of matter which are heat curable to valuable materials and are useful in the manufacture of varnishes, enamels, molding compositions, adhesives, films, fibers, molded articles, etc. More particularly, the invention is concerned with reacting and curing of glycidyl ethers to resinous products with a particular class of saturated aliphatic diamines whereby especially advantageous results are obtained.

According to the present invention, an ether containing epoxy groups so as to have an epoxy equivalency greater than one is mixed and reacted with a saturated aliphatic diamine containing two primary amino groups, one of which is directly linked to a saturated tertiary carbon atom. In order to obtain the desired favorable effects, it is essential that the diamine coupling or curing agent contains one primary amino group linked to a tertiary carbon atom, but the other primary amino group may be linked to a primary, secondary or tertiary carbon atom although it is preferred that it be linked to a secondary carbon atom. Among representative diamines which are used in the invention are 1,2-diamino-2-methylpropane, 2,3 - diamino - 2 - methylbutane, 2,4-diamino - 2 - methylpentane, 2,3 - diamino - 2,3-dimethylbutane, 2,5 - diamino-2,5-dimethylhexane, 3,4-diamino - 3,4 - dimethylhexane, 2,6 - diamino-2,6 - dimethylheptane, 2,7-diamino-2,7-dimethyloctane, etc. The diamines necessarily contain at least four carbon atoms, and it is preferred to use those of six to ten carbon atoms. The primary amino groups may be linked to adjacent or vicinal carbon atoms, or to carbon atoms separated by one or more intervening carbon atoms. The aliphatic diamine has the formula $C_nH_{2n}(NH_2)_2$ wherein $n$ is an integer of at least 4, and preferably of 6 to 10.

The compound 2,4-diamino-2-methylpentane is particularly preferred for use in the invention. For convenience, the compound will be referred to herein by the name diacetone diamine. It may be prepared in the following manner. Acetone and liquid ammonia are heated at 30° C. to 40° C. in the presence of about 1 to 5% of concentrated hydrochloric acid whereby there is formed 2,2,4,4,6 - pentamethyltetrahydropyrimidine. After separation from the reaction mixture by distillation, this compound along with liquid ammonia in a ratio of 1 to 5 mols per mol of the pyrimidine is heated and reacted at 140° C. to 150° C. in the presence of a hydrogenation catalyst such as Raney nickel with hydrogen under a pressure of 500 to 1500 pounds per square

2 inch. Further details of producing such diamine are disclosed in copending application, Serial No. 736,610, filed March 24, 1947, now Patent No. 2,486,648. In like manner, other diamines of this type which are useful in the invention may be prepared from other lower aliphatic saturated ketones such as methyl ethyl ketone, methyl propyl ketone, diethyl ketone and the like. Thus, di(methyl ethyl ketone) diamine is prepared by reacting ammonia and methyl ethyl ketone so as to produce a mixture of the isomers 2,4,5,6-tetramethyl - 2,4 - diethyltetrahydropyrimidine and 2,4 - dimethyl-2,4,6-triethyltetrahydropyrimidine which upon reaction with ammonia and hydrogen gives a mixture of 3,5-diamino-3,4-dimethylhexane and 3,5-diamino-3-methylheptane. This mixture of isomeric diamines may be termed di(methyl ethyl ketone) diamine.

The epoxy ethers contained in the compositions of the invention have at least six carbon atoms and one or more ethereal oxygen atoms. In order that the composition will cure by reaction with the diamine into material of high molecular weight and resinous character, the epoxy ether has a 1,2-epoxy equivalency which is greater than one. By the epoxy equivalency, reference is made to the average number of 1,2-epoxy groups

contained in the average molecule of the epoxy ether. In the case where a substantially pure, simple compound is used, the epoxy equivalency will be an integer of two or more. For example, the epoxy equivalency of diglycidyl ether or of the diglycidyl ether of ethylene glycol is two while that of the triglycidyl ether of glycerol is three. However, the epoxy ether may be a mixture of chemical compounds which, although they are of similar identity and chemical constitution, have different molecular weights. The measured molecular weight of the mixture, upon which the epoxy equivalency is dependent, will necessarily be an average molecular weight. Consequently, the epoxy equivalency of the epoxy ether mixture will not necessarily be an integer of two or more, but will be a value which is greater than one. For example, an epoxy ether particularly suitable for use in the invention is that made by reacting bis-(4-hydroxyphenyl)-2,2-propane with epichlorhydrin in alkaline solution at a mol ratio of about 1.4 mols of epichlorhydrin per mol of the dihydric phenol. The product is a resinous mixture of epoxy ethers having a measured average molecular weight of 791. Analysis shows the product to contain about 0.169 equivalent of epoxy groups per 100 grams. Consequently, the product has an epoxy equivalency of about 1.34—i. e., an average of about 1.34 epoxy per molecule.

The epoxy ethers used in the invention preferably contain only the elements carbon, hydrogen and oxygen. They include simple mono-ethers such as diglycidyl ether, di(2-methylglycidyl) ether and the like as well as 1,2-epoxy-containing polyethers of polyhydric alcohols such as polyglycidyl ethers thereof like diglycidyl ether of ethylene glycol, propylene glycol, trimethylene glycol, butylene glycol, diethylene glyco, triethylene glycol, glycerol, dipropylene glycol and the like. Other typical epoxy ethers of this class include glycidyl ethers of polyhydric alcohols having a 1,2-epoxy equivalency greater than one such as the polyglycidyl ethers of glycerol, diglycerol, erythritol, pentaglycerol, pentaerythritol, mannitol, sorbitol, polyallyl alcohol, polyvinyl alcohol and the like. The polyglycidyl polyethers of the polyhydric alcohols are prepared by reacting the polyhydric alcohol with epichlorhydrin in the presence of 0.1 to about 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mole of epichlorhydrin for each molecular equivalent of hydroxyl group in the polyhydric alcohol. Thus in preparing the ether of diethylene glycol, which glycol contains two hydroxyl groups in each molecule thereof, about two moles of epichlorhydrin for each mole of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

Preparation of the polyglycidyl ethers of the polyhydric alcohols may be illustrated by considering application of the foregoing method in preparing the glycidyl ether of glycerol. In parts by weight, about 276 parts of glycerol (3 moles) are mixed with 828 parts of epichlorhydrin (9 moles). To this reaction mixture is added 10 parts of a diethyl ether solution containing about 4.5% of boron trifluoride. The temperature rises as a result of the exothermic reaction and external cooling with ice water is applied so as to keep the temperature between about 50° C. and 75° C. during a reaction period of about 3 hours. About 370 parts of the resulting glycerol-epichlorhydrin condensate are dissolved in 900 parts of dioxane containing about 300 parts of sodium aluminate. While agitating, the reaction mixture is heated and refluxed at 93° C. for about 9 hours. After cooling to atmospheric temperature, the insoluble material is filtered from the reaction mixture and low boiling substances removed by distillation to a temperature of 205° C at 20 mm. pressure. The epoxy ether, in amount of 261 parts, is a pale yellow, viscous liquid. It has an epoxide value of 0.671 equivalent per 100 grams and the molecular weight is 324 as measured ebulloscopically in a dioxane solution. These values show that the glycidyl ether has an epoxy equivalency of 2.18—i. e., an average of 2.18 epoxide groups per molecule.

The 1,2-epoxide value of the glycidyl ether is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenolphthalein end point. The epoxide value is calculated by considering one HCl as equivalent to one epoxide group. This method is used for obtaining all the epoxide values discussed herein.

A preferred group of epoxy ethers with which the superior properties of the aforementioned diamines react with particular advantage are those prepared by reacting a dihydric phenol with epichlorhydrin in alkaline solution. These products are of resinous character and when used in the compositions of the invention, enable valuable materials, resistant against solvents, to be obtained upon curing with the diamines. Any of the various dihydric phenols are used in preparing these glycidyl ethers including mononuclear phenols like resorcinol, catechol, hydroquinone, etc., or polynuclear phenols like bis-(4-hydroxyphenyl)-2,2-propane(bis-phenol), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-tertiary butyl phenyl)-2,2-propane, bis-(2-dihydroxynaphthyl)-methane, 1,5-dihydroxy naphthalene, etc.

The glycidyl ethers of the dihydric phenols are made by heating at 50° C. to 150° C. the dihydric phenol with epichlorhydrin, using one to two or more moles of epichlorhydrin per mol of the dihydric phenol. Also present is a base such as sodium, potassium, calcium or barium hydroxide in amount of 10 to 30% stoichiometric excess of the epichlorhydrin—i. e., 1.1 to 1.3 equivalents of base per mol of epichlorhydrin. The heating is continued for several hours to convert the reactant to a taffy-like consistency whereupon the reaction product is washed with water until free of base. Although the product is a complex mixture of glycidyl ethers, the principal product may be represented by the formula

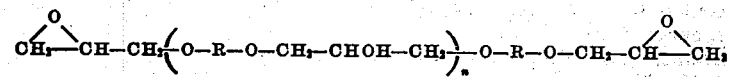

wherein R represents the divalent hydrocarbon radical of the dihydric phenol and $n$ is 0, 1, 2, 3, etc. The length of the chain can be made to vary by changing the molecular proportion of epichlorhydrin and dihydric phenol. Thus by decreasing the mols of epichlorhydrin per mol of dihydric alcohol from about two downwards towards one, the molecular weight and the softening point of the resinous glycidyl ether is increased. In general, these glycidyl ethers, having an epoxy equivalency between one and two, contain terminal 1,2-epoxy groups, and have alternate aliphatic and aromatic nuclei linked together by ethereal oxygen atoms.

The nature of the glycidyl ethers from dihydric phenols can be better understood by considering preparation of a particular product which I prefer to use in my invention. This product will hereinafter be designated by the term Resin A.

Resin A

In a reaction vessel fitted with a stirrer, 4 mols of bis-(4-hydroxyphenyl)-2,2-propane (bis-phenol) and 5 mols of epichlorhydrin are added to 6.43 mols of sodium hydroxide as a 10% aqueous solution. While being stirred, the reaction mixture is gradually heated to about 100° C. during 80 minutes time and is maintained at 100–104° C. for an additional 60 minutes under reflux. The aqueous layer is decanted and the resin washed with boiling water until neutral to litmus whereupon the resin is drained and dehydrated by heating to about 150° C.

The resulting resinous glycidyl ether has a softening point of 100° C. (Durran's Mercury method) and a molecular weight of 1133 measured by boiling point elevation of a dioxane solution. The epoxide value is 0.116 equivalent per 100 grams so the epoxide equivalency is 1.32 epoxide groups per molecule.

In like manner, other resinous glycidyl ethers of bis-phenol may be prepared which will have different molecular weights depending upon the molar ratio of epichlorhydrin to dihydric phenol used in preparation thereof. This fact is illustrated by the following table which shows the variation in properties with variation in the molar ratio.

| Mol Ratio Epichlorhydrin to bis-Phenol | Mol Ratio NaOH to Epichlorhydrin | Softening Point °C. | Molecular Weight | Equiv. Epoxy per 100 gms. | Epoxy Groups per Mol |
|---|---|---|---|---|---|
| 2.15 | 1.1 | 43 | 451 | 0.318 | 1.39 |
| 1.4 | 1.3 | 84 | 791 | 0.169 | 1.34 |
| 1.33 | 1.3 | 90 | 802 | 0.137 | 1.10 |
| [1] 1.25 | 1.3 | 100 | 1,133 | 0.116 | 1.32 |
| 1.2 | 1.3 | 112 | 1,420 | 0.085 | 1.21 |

[1] Resin A.

These glycidyl ethers from bis-phenol are a complex mixture of compounds believed to have as the principal component thereof a substance which may be represented by the formula

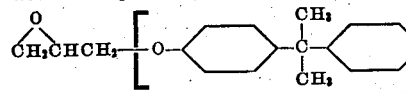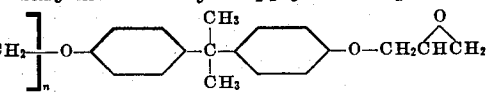

wherein $n$ is 0, 1, 2, 3, etc. It may be noted that the observed molecular weight and epoxy value is probably low due to inherent inaccuracies of the methods of determining the values. The epoxy value appears to give only about 60% of the theoretical value, but in any event the epoxy equivalency is greater than one and the resinous glycidyl ethers cure to hard, tough, insoluble and infusible resins upon heating with the diamines used in the invention.

The compositions of the invention comprise (1) the epoxy ether having a 1,2-epoxy equivalency greater than one, and (2) a saturated aliphatic diamine containing two primary amino groups, one of which is directly linked to a tertiary carbon atom. The relative amounts of the two essential components of the compositions may be varied. Most preferably there is used approximately an equivalent amount of the diamine—i. e., such an amount that there is one primary amino group for each 1,2-epoxy group in the epoxy ether. For example, when diglycidyl ether is used with diacetone diamine, the ether has an epoxy value of about 1.54 equivalents of epoxy per 100 grams and the diamine has an amino value of about 1.72 equivalents of amino per 100 grams so there is preferably used about 90 parts by weight of the diamine with each 100 parts by weight of the ether. Likewise, when the glycidyl ether of bis-phenol is used such as Resin A having an epoxy value of about 0.116 equivalents of epoxy per 100 grams, it is preferred to have the composition contain about 6.7 parts by weight of diacetone diamine for each 100 parts of the glycidyl ether.

While it is particularly preferred to use an equivalent amount of the diamine in the compositions so as to have present one amino group per epoxy group, good results with curing to infusible products are obtained with 60% to 120% of the equivalent amount of the diamine is employed. By varying the diamine from such preferred proportions, the fusibility and solubility properties of the reacted product may be regulated and modified. The use of diamine below about 60% or above about 120% of the equivalent amount will tend to reduce the toughness, increase the brittleness and decrease the heat distortion point of the reaction product. Moreover, the products will generally be fusible. In some cases, products of such type are desirable. There can be used as little as about down to 5% of the equivalent amount of diamine or up to about 300%. Compositions containing a large excess of diamine are useful for production of fusible and soluble reaction products which find application as chemical intermediates.

The compositions of the invention are best reacted or cured by heating at a temperature of 50° C. to 250° C. Some of the compositions such as those containing the epoxy ether made from glycerol and epichlorhydrin will set up and cure in reasonable times at lower temperatures including ordinary atmospheric temperatures like from 15° C. to 25° C. Other compositions containing an epoxy ether having aromatic groups therein such as Resin A, for example, react very slowly at such lower temperatures. This is advantageous in the use and application of the preferred compositions because they are stable for several days' time. Consequently, the diamine may be mixed with the epoxy ether and it is not necessary immediately to apply the composition for the purpose intended such as protective coatings, molding materials and the like. When the composition contains the diamine in the preferred proportion, it sets up and cures to a hard, tough product upon application of heat. At preferred temperatures of 125° C. to 175° C., the reaction is complete in from about 10 minutes to an hour's time.

The compositions of the invention containing the preferred proportions of diamine are particularly useful for protective coatings by dissolving in an organic solvent and applying the solution to a surface with subsequent curing of the film of resin-forming material. Various solvents are suitable for this purpose such as lower saturated ketones like acetone, methyl ethyl ketone, methyl isobutyl ketone, methyl hexyl ketone, cyclohexanone, methyl cyclohexanone, etc.; esters like ethyl acetate, isopropyl acetate, butyl acetate, isoamyl acetate, etc.; and monoalkyl ethers of ethylene glycol like methyl, ethyl or butyl ethers. Preferably such solvents have a boiling point below 175° C. If desired, other materials like lower aromatic hydrocarbons such as benzene, toluene and/or xylene may be used in combination with the oxygen-containing compounds for the purpose of cheapening the cost of the solvent.

The solutions of the compositions of the invention are applied for coating surfaces needed to be protected by brushing, spraying and the like. The amount of solvent contained in the solution may be varied to suit the particular need. Ordinarily, the solution will contain about 5% to 60% of the composition of the invention. The solution is applied to the surface to be coated, and either the solvent is first allowed to evaporate, after which heat is applied by circulating hot air or by use of infra-red lamps, or the heating is effected with simultaneous removal of solvent and curing.

The coated surfaces containing a film of the cured composition have very desirable properties and this is especially true when the epoxy ether used in the composition is a glycidyl ether of a dihydric phenol such as Resin A, for example. When cured, the resulting film is resistant to attack by acids such as 50% sulfuric acid. The film is remarkably resistant to the action of alkalis as distinguished from most film-forming materials such as unsaturated fatty oils and oil-modified alkyds. Thus, it may be boiled in 5% aqueous sodium hydroxide without harm.

When used as film-forming agents, the compositions may have various other materials incorporated therewith besides solvents such as pigments and other resins. Thus pigments like titanium oxide, antimony oxide, carbon black, chrome yellow, zinc oxide, para red, and the like, may be used. Best results in preparing the enamels are obtained by grinding the pigment with a portion of the solvent and epoxy ether, and then adding the remainder of the solvent and epoxy ether after the grinding operation. The enamel is ready for application upon addition of the curing agent, the diamine.

With either varnishes or enamels containing the compositions of the invention having the diamine in preferred proportions, thick layers of the film-forming material may be applied to a surface. Curing completely therethrough is attained because the conversion to an insoluble film is not dependent upon contact with air. This fact also makes the compositions valuable in manufacture of laminates wherein the laminae are cloth, paper, glass-cloth and the like. Such laminae are impregnated with the compositions which are ordinarily dissolved in a volatile solvent like acetone. After drying, and, if desired, partial curing, the impregnated sheets are stacked and the cure completed in a press using sufficient pressure to form a homogeneous and coherent mass for the resin-forming material such as 200 to 1000 or more pounds per square inch.

The new compositions possess a peculiar and unexpected property making them particularly suitable for molding operations. Most resin-forming materials contract in volume during curing thereof. In contrast, the compositions of the invention tend to expand during curing. Consequently, upon manufacturing molded articles from the compositions by introducing the compositions into a mold with application of the curing heat and pressure, the resin-forming material flows and fills the mold sharply so that excellent molded articles are obtained. The compositions are not only useful for molding, but also for casting in plaster of Paris, rubber or other molds. Various fillers, dyes, and pigments may be incorporated with the compositions used for molding or casting such as wood flour, talc, alpha-cellulose, zinc sulfide, etc.

In comparison with acidic coupling agents, the aliphatic diamines containing two primary amino groups, one of which is linked directly to a tertiary carbon atom, cure the glycidyl ethers into a resinous body having superior properties to that obtained by use of acidic coupling agents such as dicarboxylic acid anhydrides like maleic anhydride, for example. Thus, when a 50% solution of Resin A in methyl ethyl ketone is prepared and 8.8% of maleic anhydride, based on the amount of glycidyl ether, is added, the resinous film obtained by spreading the composition on a glass panel and baking at 150° C. for 30 minutes is so soft that it mars easily with a finger nail and is brittle so as to tend to chip when plowed with a knife point rather than giving a coherent ribbon. On the other hand, the film prepared in like manner using a 50% solution of Resin A in methyl ethyl ketone to which 6.5% diacetone diamine based on the weight of resin, is added with curing by baking at 150° C. for 30 minutes, is so hard that it cannot be scratched or marred with a finger nail and is also tough so as to give a continuous coherent ribbon upon being plowed with the point of a knife. Moreover, a film having the same hardness and toughness is obtained when 3.8% diacetone diamine is substituted for the 6.5% diamine. Another composition of the invention also gives a hard, tough film. This is prepared by dissolving an equal weight of Resin A in a 50–50 mixture of xylene and monobutyl ether of ethylene glycol, and adding 2.8% of the mixture of diamines described before, namely, di(methyl ethyl ketone) diamine. The solution is spread on a glass plate, the solvent allowed to evaporate, and is then baked at 150° C. for 30 minutes. Besides being hard and tough, this film, like that obtained by curing with diacetone diamine, adheres tenaciously to the glass.

The product obtained from the composition of the invention has excellent toughness and hardness so as to provide a useful coating material. This is evident from results obtained with a composition consisting of equal parts by weight of Resin A and a 50–50 mixture of the monobutyl ether of ethylene glycol and xylene to which had been added 4.5% of diacetone diamine based on the weight of the resin. This solution upon application to a steel panel with baking for 30 minutes at 150° C. after evaporation of the solvent, gave a cured film having a Sward hardness of 41 and a Taber abrasion of 4.5 mg. per 100 cycles.

As a general observation in the chemical and resin arts, amines are notorious in giving dark colored products when reacted especially where application of heat is involved. It was surprising to discover that while primary diamines having the amino groups attached to primary carbon atoms had a marked tendency toward formation of discolored products when used as curing agents for the epoxy ethers, the diamines used in the present invention which contain at least one primary amino group linked to a tertiary carbon atom having the unexpectedly superior property of curing the epoxy ether with little or no development of color. Furthermore, upon subjecting the cured products to prolonged heating, the products from said primary diamines are prone to develop considerable color while those cured with the diamines used in the invention are relatively resistant to development of further discoloration.

These facts may be illustrated by results obtained with enamels containing the composition of the invention wherein diacetone diamine is present as curing agent in comparison with use of diethylene triamine which contains each of the primary amino groups linked to primary carbon atoms. Two groups of enamels were prepared using a different solvent in each group. In each case, the base was prepared from the ingredients noted below by dissolving the resin in the solvent, adding the pigment and grinding in a ball mill for 28–30 hours. Base I contained one-third part by weight each of Resin A, titanium dioxide pigment, and methyl isobutyl ketone. Base II contained 30.8% by weight of Resin A, 30.8% of titanium dioxide pigment and 38.4% of monomethyl ether of ethylene glycol. Portions of each base were weighed out and the curing agent noted in the table below was added, the percentage being based on the amount of Resin A contained therein. The enamels were coated on clean steel panels which were then baked at 150° C. for 30 minutes. A second coat was applied in the same manner. The table below gives the results.

| Base | Curing Agent | Scratch Test | Toluene Spot Test | Color after Baking at 150° C. for— | |
|---|---|---|---|---|---|
| | | | | 30 min. | 24 hrs. |
| I | None | Brittle | Dissolved | 0 | 0 |
| I | Diacetone diamine, 6% | Tough | Unchanged | 0 | 2 |
| I | Diethylene triamine, 4% | do | do | 2 | 5 |
| II | None | Brittle | Dissolved | 0 | |
| II | Diacetone diamine, 6% | Tough | Unchanged | 0 | 2 |
| II | Diethylene triamine, 4% | do | do | 0 | 5 |

With reference to the foregoing table, the scratch test was performed by plowing a knife point into the cured film. The designation "tough" is used to denote a film which gave a continuous tough ribbon, while "brittle" is used to designate a film which gave a shower of chips. The toluene spot test is a measure of the resistance of the film to solvents and was performed by placing a drop of toluene on the cured film with observation of the effect thereof after 15 minutes. The color scale employed was as follows: The numeral 0 indicates the film was pure white like before baking and the numeral 5 indicates a light ivory color, while intermediate numerals have reference to uniform graded variations therebetween.

The superior color characteristics obtained with the compositions of the invention are not confined to enamels containing titanium dioxide as pigment. White enamel bases were prepared using 40.2% by weight of antimony oxide as pigment, 26.8% of Resin A, and 33% of solvent consisting of a 50–50 mixture of xylene and monobutyl ether of ethylene glycol. To portions of this base, the curing agents noted in the table below were added, the percentage being by weight based upon the weight of Resin A in the enamel. The enamels were flowed out on tin-plated steel panels and baked for 30 minutes at 150° C.

| Curing Agent | Color of Cured Film |
|---|---|
| 4.5% diacetone diamine | Good white color. |
| 2.33% ethylene diamine | Intermediate color (off white). |
| 4% diethylene triamine | Light ivory color. |

The resistance of the compositions of the invention against discoloration is most marked when ketones are used in the solvent. The diamines containing two primary amino groups linked to primary carbon atoms probably react to some extent with ketones and produce dark colored products. When the same tests with the antimony oxide pigmented enamel were repeated using a solvent composed of 60% methyl ethyl ketone, 20% n-butyl acetate and 20% xylene, the diacetone diamine also gave the good white color, but the other two amines gave films which were discolored far more than when the solvent was the mixture of xylene and monobutyl ether of ethylene glycol.

Since the presence of the pigment in the cured enamel tends to mask discoloration in the resin of the film, unpigmented varnishes were prepared. Varnish base III was prepared by dissolving an equal amount by weight of Resin A in a solvent consisting of a 50–50 mixture of xylene and monobutyl ether of ethylene glycol. Varnish base IV contained an equal amount of Resin A dissolved in methyl ethyl ketone. To the varnishes were added the curing agents noted in the table below, the percentage being based on the weight of the resin in the composition. The films were obtained by flowing the varnishes on glass panels and curing for 30 minutes at 150° C.

| Base | Curing Agent | Color of Cured Film |
|---|---|---|
| III | 4.5% diacetone diamine | Colorless. |
| III | 4% diethylene triamine | Brown tint. |
| IV | 4.5% diacetone diamine | Colorless. |
| IV | 4% diethylene triamine | Darkest brown tint. |

An excellent heat curable enamel containing a composition of the invention is prepared using equal parts by weight of methyl ethyl ketone, powdered titanium dioxide pigment and Resin A. To this mixture is added 1% to 2% by weight of diacetone diamine. The resulting enamel is brushed or sprayed onto surfaces and may be cured to a hard tough white film by baking for 10 minutes to one-half hour at 125° C. to 175° C.

The compositions are well suited for manufacture of laminated articles, which operation may be illustrated by laminates of duck cloth. A 50% solution of Resin A in acetone was prepared and 3% of diacetone diamine, based upon the weight of resin, added thereto. Sheets of duck cloth were dipped in the solution and allowed to dry and pre-cure in circulating air at 105° C. for the time noted in the table below. This gave dry impregnated sheets which were convenient to handle and stack. Four-ply laminates were obtained from the impregnated sheets by stacking and hardening between stainless steel cauls. The hardening was effected by heating for 10 minutes at 155° C. under a pressure of 200 pounds per square inch. Smooth surfaced laminates of high strength and excellent gloss were obtained. The surface of the laminates was of satisfactory hardness although it varied some with the time of pre-cure utilized as is seen from the following table:

| Time of Pre-cure | Barcol Hardness |
|---|---|
| 4 minutes | 34 |
| 6 minutes | 40 |
| 8 minutes | 41 |

The compositions are also useful as adhesives for uniting various objects such as wood, paper, resins, or even metal. When a very reactive epoxy ether is used in the adhesive such as that from a polyhydric alcohol and epichlorhydrin, the compositions may be used as cold setting glues since they set up and cure hard in reasonable times at ordinary atmospheric temperature like from 15° C. to 25° C. If desired, the compositions may be used as adhesives with curing at the elevated temperatures described hereinbefore. The glue line obtained with either cold-set or hot-set compositions of the invention is characterized by its very high strength. For example, an adhesive composition was prepared by mixing equal parts by weight of Resin A and the epoxy ether from glycerol and epichlorhydrin prepared as described hereinbefore. The mixture was a viscous liquid having a viscosity of about 4600 centipoises at 22–23° C. To the mixture was added 15% by weight of diacetone diamine as curing agent. The adhesive composition was spread on a one inch square surface of each of two carefully cleaned blocks of phenolic resin with the aid of a doctor blade having a clearance of 0.005 inch. The adhesive coated surfaces of the blocks were then united and the blocks were placed in a constant temperature room set at 77° F. The adhesive gelled in 2 hours' time. After 6 days, the blocks were subjected to the block shear test of the Army-Navy-Civil Committee on Aircraft Design Criteria: "Wood Aircraft Inspection and Fabrication." ANC-19 (December 20, 1943) discussed in an article by R. C. Rinker and G. M. Kline, Modern Plastics, vol. 23, p. 164, 1945. It was found that the cold cured adhesive had a shear strength of 3000 pounds per square inch. This is a high value for adhesives. Plywood or oak blocks could not be used in the test because the adhesive had a higher shear strength than the wooden blocks themselves.

I claim as my invention:

1. A composition of matter comprising an epoxy ether having a 1,2-epoxy equivalency greater than one which is devoid of other reactive substituents than alcoholic hydroxyl groups, and 5% to 300% of the equivalent amount of a saturated aliphatic diamine of the formula $C_nH_{2n}(NH_2)_2$ wherein $n$ is an integer of at least 4 containing two primary amino groups, one of which is directly linked to a tertiary carbon atom.

2. A composition of matter comprising an epoxy ether having a 1,2-epoxy equivalency greater than one which is devoid of other reactive substituents than alcoholic hydroxyl groups, and 60% to 120% of the equivalent amount of 2,4-diamino-2-methylpentane.

3. A composition of matter comprising a glycidyl ether of bis-(4-hydroxyphenyl)-2,2-propane having a 1,2-epoxy equivalency greater than one, and 60% to 120% of the equivalent amount of 2,4-diamino-2-methylpentane.

4. A composition of matter comprising an acetone solution of a glycidyl ether of bis-(4-hydroxyphenyl)-2,2-propane having a 1,2-epoxy equivalency of greater than one, and 60% to 120% of the equivalent amount of 2,4-diamino-2-methylpentane.

5. A composition of matter comprising a methyl ethyl ketone solution of a glycidyl ether of bis-(4-hydroxyphenyl)-2,2-propane having a 1,2-epoxy equivalency of greater than one, and 60% to 120% of the equivalent amount of 2,4-diamino-2-methylpentane.

6. A heat curable enamel comprising 1% to 2% by weight of 2,4-diamino-2-methylpentane and equal parts by weight of methyl ethyl ketone, powdered titanium dioxide pigment and a glycidyl ether of bis-(4-hydroxy-phenyl)-2,2-propane having a 1,2-epoxy equivalency of 1.32 and a Durran's Mercury method softening point of 100° C.

7. A composition of matter comprising a glycidyl ether of glycerol having a 1,2-epoxy equivalency greater than one, and 60% to 120% of the equivalent amount of 2,4-diamino-2-methylpentane.

8. A process for producing a resinous product which comprises reacting an epoxy ether having a 1,2-epoxy equivalency greater than one which is devoid of other reactive substituents than alcoholic hydroxyl groups with a saturated aliphatic diamine of the formula $C_nH_{2n}(NH_2)_2$ wherein $n$ is an integer of at least 4 containing two primary amino groups, one of which is linked directly to a tertiary carbon atom.

9. The resinous product obtained by the process defined in claim 8.

10. A process for producing a resinous product which comprises reacting by heating at 50° C. to 250° C. a glycidyl ether of a dihydric phenol having a 1,2-epoxy equivalency between one and two which is devoid of other reactive substituents than alcoholic hydroxyl groups with 60% to 120% of the equivalent amount of a saturated aliphatic diamine of the formula $C_nH_{2n}(NH_2)_2$ wherein $n$ is an integer of at least 4 containing two primary amino groups, one of which is linked directly to a tertiary carbon atom and the other of which is linked directly to a secondary carbon atom.

11. The resinous product obtained by the process defined in claim 10.

12. A process for producing a resinous product which comprises reacting by heating at 125° C. to 175° C. a glycidyl ether of bis-(4-hydroxyphenyl)-2,2-propane having a 1,2-epoxy equivalency between one and two with 60% to 120% of the equivalent amount of 2,4-diamino-2-methylpentane.

13. The resinous product obtained by the process defined in claim 12.

14. A process for producing a resinous product which comprises reacting a glycidyl ether of glycerol having a 1,2-epoxy equivalency greater than one with 2,4-diamino-2-methylpentane.

15. The resinous product obtained by the process defined in claim 14.

THEODORE F. BRADLEY.

REFERENCES CITED

The following references are of record in the file of this patent:

UNITED STATES PATENTS

| Number | Name | Date |
|---|---|---|
| 2,136,928 | Schlack | Nov. 15, 1938 |
| 2,444,333 | Castan | June 29, 1948 |